United States Patent
Narayanan et al.

(10) Patent No.: US 10,900,492 B2
(45) Date of Patent: Jan. 26, 2021

(54) METHOD OF ANTI-SURGE PROTECTION FOR A DYNAMIC COMPRESSOR USING A SURGE PARAMETER

(71) Applicant: ENERGY CONTROL TECHNOLOGIES, INC., Urbandale, IA (US)

(72) Inventors: Krishnan Narayanan, Urbandale, IA (US); Paul Reinke, Elkhart, IA (US)

(73) Assignee: Energy Control Technologies, Inc., Urbandale, IA (US)

( * ) Notice: Subject to any disclaimer, the term of this patent is extended or adjusted under 35 U.S.C. 154(b) by 343 days.

(21) Appl. No.: 15/856,713

(22) Filed: Dec. 28, 2017

(65) Prior Publication Data

US 2018/0135637 A1    May 17, 2018

Related U.S. Application Data

(63) Continuation-in-part of application No. 12/777,445, filed on May 11, 2010, now abandoned.

(51) Int. Cl.
    *F04D 27/02*    (2006.01)
    *G05B 15/02*    (2006.01)
    (Continued)

(52) U.S. Cl.
    CPC ....... *F04D 27/0246* (2013.01); *F04D 27/001* (2013.01); *F04D 27/02* (2013.01);
    (Continued)

(58) Field of Classification Search
    CPC ... F04D 27/02; F04D 27/0207; F04D 27/0223
    See application file for complete search history.

(56) References Cited

U.S. PATENT DOCUMENTS

| 4,156,578 A | 5/1979 | Agar et al. |
| 4,464,720 A | 8/1984 | Agarwal |
| (Continued) | | |

FOREIGN PATENT DOCUMENTS

| EP | 0676545 A2 | 10/1995 |
| WO | 9724512 A1 | 7/1997 |
| WO | 2010040734 A1 | 4/2010 |

OTHER PUBLICATIONS

European Extended Search Report, "Communication of the Extended Search Report and Search Opinion" by the European Patent Office in Munich, Germany, for European Application No. 18178650.0, dated Oct. 4, 2018, 7 pages.

*Primary Examiner* — Patrick Hamo
(74) *Attorney, Agent, or Firm* — Zarley Law Firm, P.L.C.

(57) ABSTRACT

A method of surge protection for a dynamic compressor that has a corresponding compressor map. A control system continually calculates an equivalent polytropic head parameter in order to define a surge limit line. The system then calculates a control parameter and determines the distance the control parameter to the surge limit line wherein the control parameter is dynamic to changes in gas compressibility and invariant to changes in suction conditions and gas compressibility. As a result of the distance of the control parameter to the surge limit line, the surge valve of a dynamic compressor is actuated to prevent surge.

12 Claims, 4 Drawing Sheets

(51) Int. Cl.
  *G05D 7/06* (2006.01)
  *F04D 27/00* (2006.01)
(52) U.S. Cl.
  CPC ......... *F04D 27/0223* (2013.01); *G05B 15/02* (2013.01); *G05D 7/0676* (2013.01)

(56) References Cited

U.S. PATENT DOCUMENTS

| | | | |
|---|---|---|---|
| 4,949,276 A | 8/1990 | Staroselsky et al. | |
| 4,971,516 A | 11/1990 | Lawless | |
| 5,195,875 A | 3/1993 | Gaston | |
| 5,306,116 A | 4/1994 | Gunn et al. | |
| 5,508,943 A * | 4/1996 | Batson | F04D 27/0207 700/287 |
| 5,599,161 A | 2/1997 | Batson | |
| 5,743,715 A * | 4/1998 | Staroselsky | F04D 27/02 417/6 |
| 5,798,941 A | 8/1998 | McLeister | |
| 5,908,462 A | 6/1999 | Batson | |
| 6,503,048 B1 * | 1/2003 | Mirsky | F01D 21/12 415/1 |
| 7,094,019 B1 | 8/2006 | Shapiro | |
| 9,074,606 B1 * | 7/2015 | Moore | F04D 17/12 |
| 9,133,850 B2 * | 9/2015 | Narayanan | F04D 27/0223 |
| 10,060,428 B2 * | 8/2018 | Galeotti | F04D 27/02 |
| 2011/0280738 A1 * | 11/2011 | Narayanan | F04D 27/0207 417/53 |
| 2012/0100013 A9 * | 4/2012 | Narayanan | F04D 27/0207 417/53 |
| 2015/0300347 A1 * | 10/2015 | Galeotti | F04D 27/02 417/53 |

\* cited by examiner

METHOD OF ANTI-SURGE PROTECTION FOR A DYNAMIC COMPRESSOR USING A SURGE PARAMETER

CROSS REFERENCE TO RELATED APPLICATION

This application is a continuation-in-part of U.S. patent application Ser. No. 12/777,445 filed on May 11, 2010.

BACKGROUND OF THE INVENTION

The present invention is directed toward a dynamic compressor. More specifically, the present invention is directed toward a method of surge protection utilizing an equivalent map surge parameter.

A typical dynamic compressor has a gas inlet and a gas outlet wherein the compressor is driven by a compressor driver so that the gas, while flowing through the compressor, is compressed. A problem associated with dynamic compressors is the amount of gas that passes through the compressor. Specifically, if an insufficient amount of gas flows through the compressor, a surge occurs within the system causing damage to the compressor. Because of the high price of compressors great care must be taken to ensure that compressors are not damaged.

To minimize damage to compressors as a result of lack of gas flow at an inlet an anti-surge or recycling valve is utilized by dynamic compressors to take gas from the outlet of the compressor and recycle it back to the inlet of the compressor to ensure that there is always sufficient gas flowing though the compressor to prevent surges from occurring.

As a result of the need to protect against surge, control systems have been provided to control the operation of the anti-surge valve. Compressor surge control systems (also known as anti-surge controllers) use a PID controller for regulating the anti-surge valve when flow rate decreases below a predefined point.

Control systems in the art monitor the dynamic compressor system and determine a corresponding compressor map as can be seen in U.S. Pat. No. 4,156,578 to Agar and U.S. Pat. No. 4,949,276 to Staroselsky. In both references, a function of volumetric flow at the inlet of the compressor is charted against the polytropic head of the compressor to determine a surge line or surge limit line. The surge limit line represents the line on the graph that once passed (a point immediately to the left of the surge limit line) surging of a compressor can occur. Thus, to prevent surging a safety margin is determined and a surge control line is plotted to the right of the surge limit line. The control system then continuously calculates a control parameter that measures a distance to the surge limit line. If the control parameter reaches or is to the left of the surge control line, the controller actuates the anti-surge valve to increase gas flow through the compressor to prevent the control parameter from reaching the surge limit line and causing a surge within the compressor.

Problems in systems such as that taught by Agar and Staroselsky exist because measuring the volumetric flow and the polytropic head in practice is not practical. There are problems associated with molecular weight and gas density determinations causing these measurements to be inadequate for real time surge protection. Hence, controllers in the industry employ either fan law method or use similitude theory to derive surge control parameters that in theory are invariant to changes in suction conditions or gas composition. However, existing methods for invariant parameter calculations do not completely account for variability in gas compressibility or gas specific heat ratio. As a result, variations in gas compressibility tend to make the surge parameter and surge limit line move resulting in operating problems.

Therefore, a principal objective of the present invention is to provide a method of surge protection for a dynamic compressor that prevents damage to the dynamic compressor.

Yet another objective of the present invention is to provide a method of surge protection for a dynamic compressor that accounts for multiple variables in determining a control parameter.

These and other objectives, features, or advantages of the present invention will become apparent from the specification and claims.

SUMMARY OF THE INVENTION

A method of surge protection for a dynamic compressor having a corresponding performance map. The method includes continually calculating an equivalent polytropic head parameter and an equivalent flow parameter. Next, the method involves defining a surge limit line on the compressor map as a function of the equivalent polytropic head parameter. Then a control system continually calculates a distance a control parameter is from the surge limit line wherein the control parameter is dynamic to changes in gas compressibility. Based on the distance an anti-surge valve is adjusted.

DETAILED DESCRIPTION OF THE PREFERRED EMBODIMENT

Figure 1:
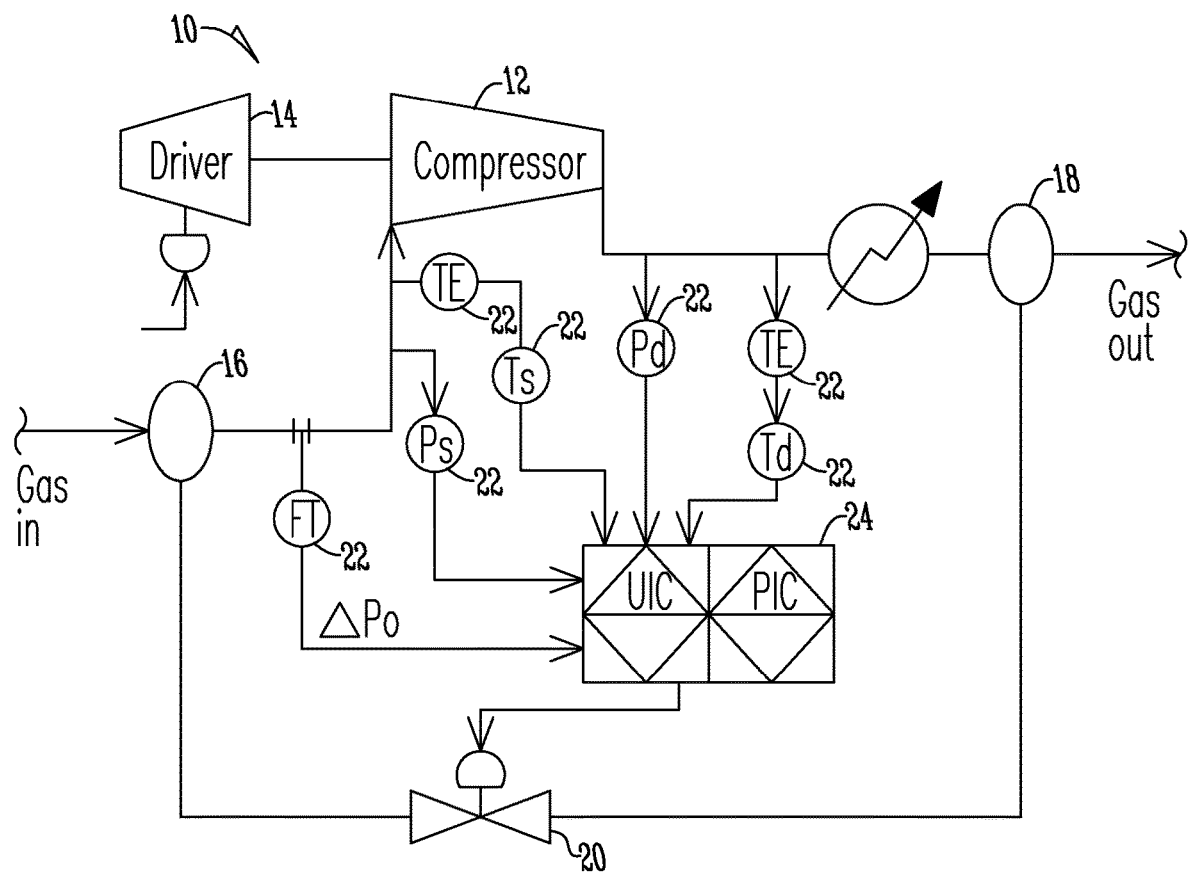
FIG. 1 is a schematic diagram of a dynamic compressor.

FIG. 1 shows a dynamic compressor 10 that includes a compressor 12 that is driven by a compressor driver 14. The compressor driver is of any type including a motor, gas turbine, steam turbine, expander or the like. The compressor 12 has a gas inlet 16 and a gas outlet 18 wherein gas flows through the compressor 12 to be compressed. An anti-surge or recycle valve 20 is fluidly connected between the gas inlet 16 and gas outlet 18 so that when the anti-surge valve 20 opens a fluid flow path exists to convey gas from the gas outlet 18 to the gas inlet 16. A plurality of sensors 22 including pressure sensors, temperature sensors, flow measurement sensors and the like are placed throughout the dynamic compressor 10 in order to determine processed conditions for the components of the dynamic compressor including the compressor 12, the driver 14, the gas inlet 16, and gas outlet 18 and the anti-surge valve 20. The plurality of sensors 22 are electrically connected to the control system 24 where the control system 24 is in communication with all of the components of the dynamic compressor and controls the opening of the anti-surge valve 20.

Figure 2:
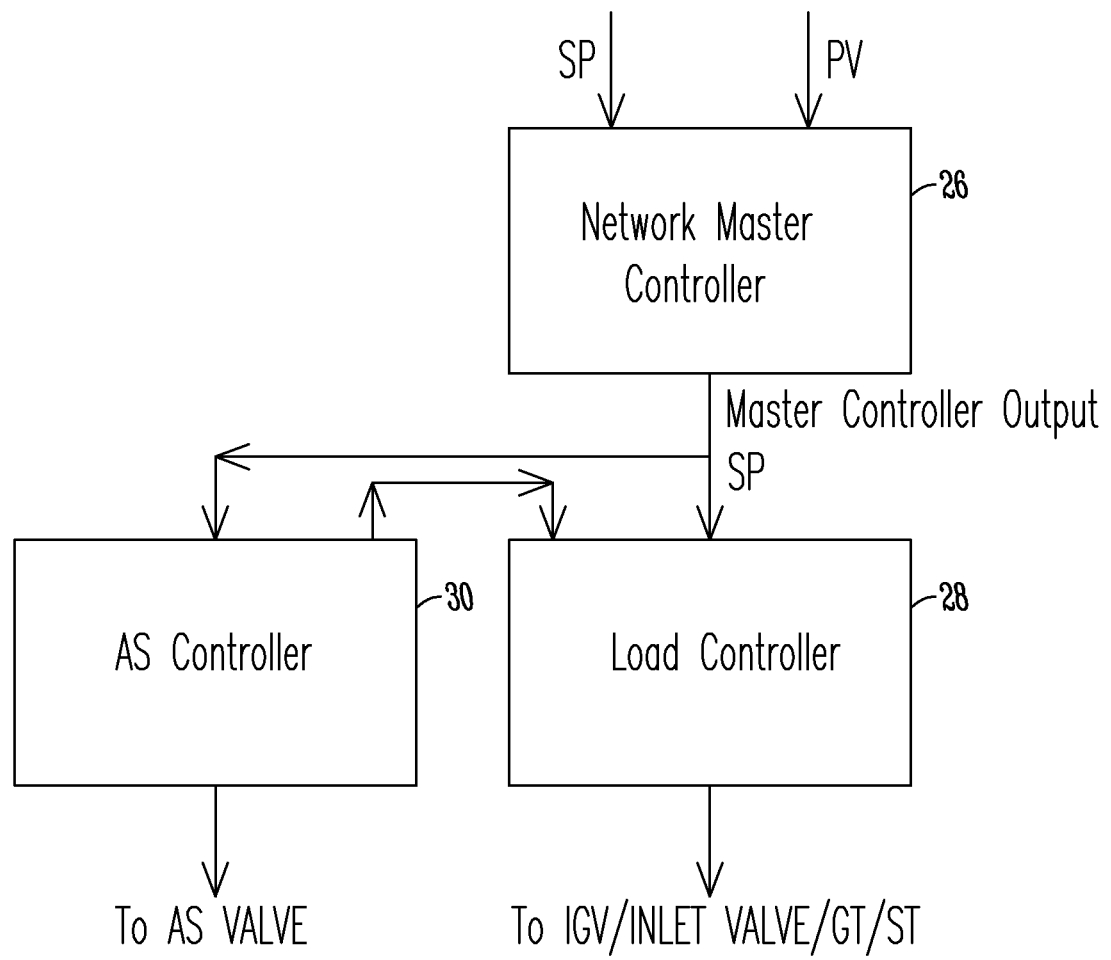
FIG. 2 is a block diagram of a control system of a dynamic compressor.

FIG. 2 shows a control system 24 used for a dynamic compressor 10. Specifically, a controller 26 such as a Network Master controller is utilized in combination with a load controller 28 that monitors the inlet 16 of the dynamic compressor 10 and a surge controller 30 that monitors and operates the anti-surge valve 20. The arrangement and set up of the control system 24 shown in FIG. 2 is merely an example of a control system 24 for a dynamic compressor 10 and is shown as exemplary. Specifically, other control arrangements that utilize Master controllers, load controllers, and surge controllers in series cascade and parallel cascade can be used without falling outside the scope of the present invention.

Figure 3:
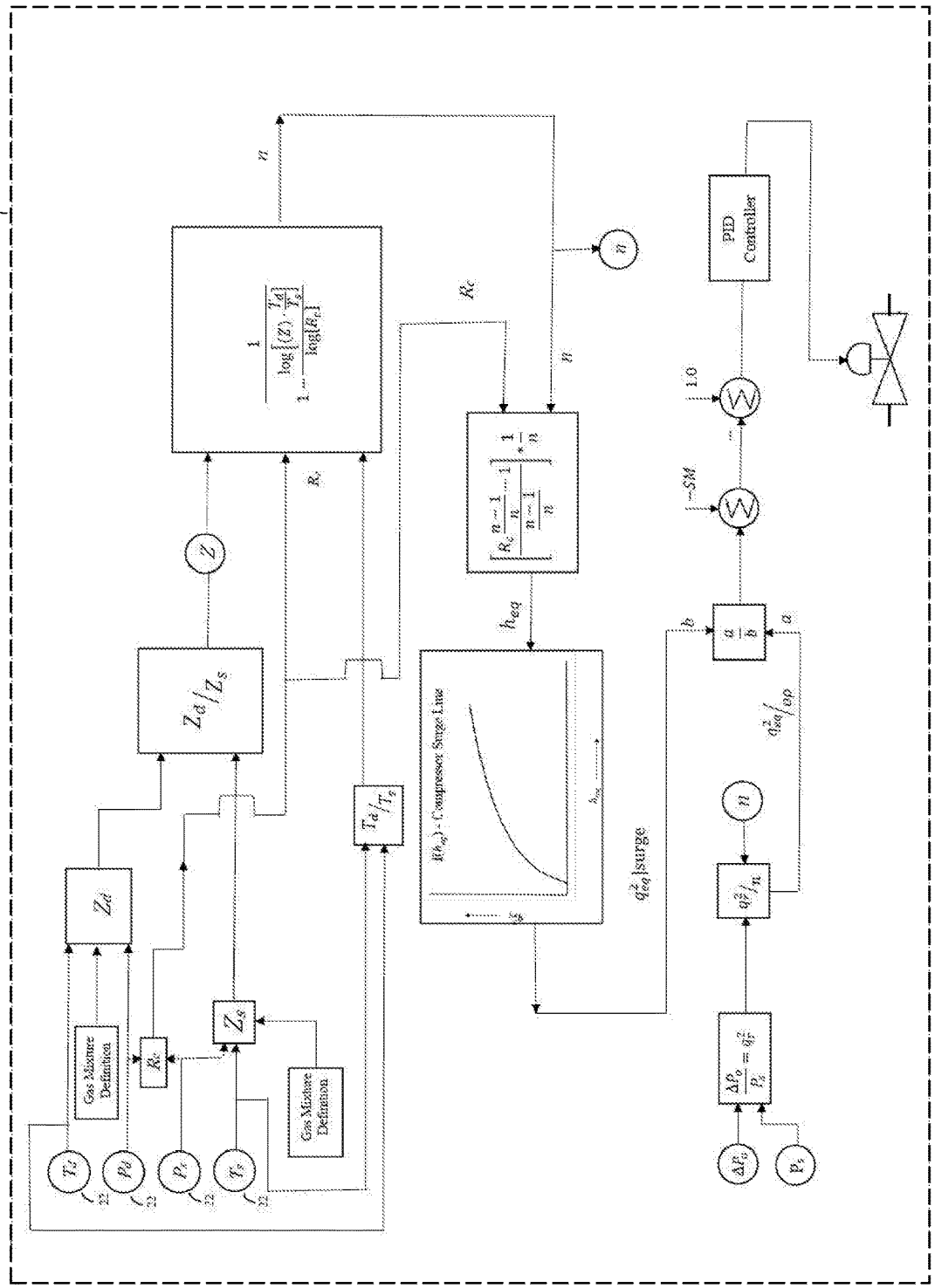
FIG. 3 is a schematic diagram of a surge control system of a dynamic compressor.

FIG. 3 is yet another exemplary embodiment of the control system 24 used with another dynamic compressor 10. In this embodiment the station and load controllers are not used and instead the control system 24 takes readings straight from the plurality of sensors 22 to determine an input to the surge valve 20.

Figure 4:
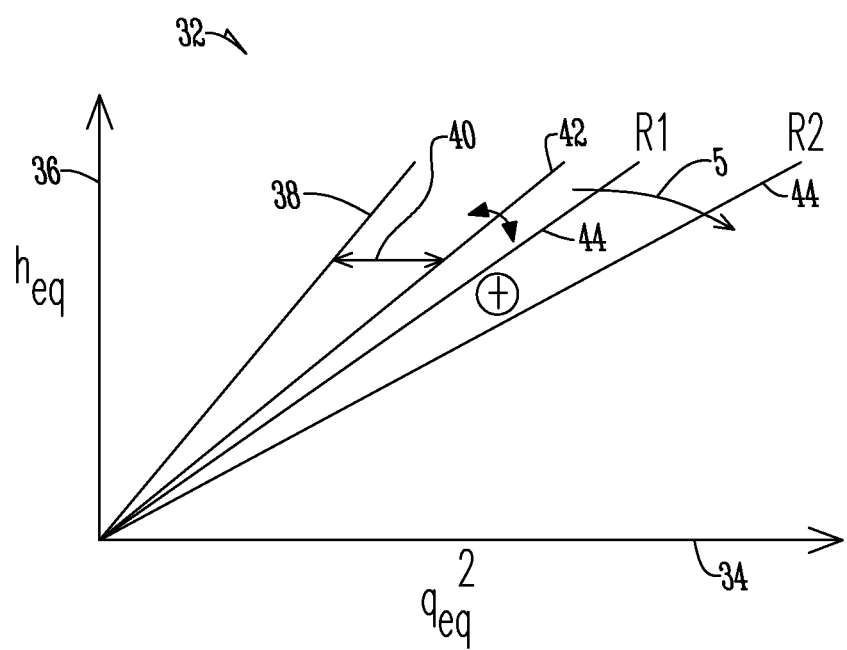
FIG. 4 is a graph having equivalent flow squared versus equivalent polytropic head.

The control system 24 of the present invention, like prior art control systems, determines a compressor map that corresponds to the dynamic compressor 10 as best shown in FIG. 4. In the present invention the compressor map 32 presents a horizontal axis 34 that measures the square of an equivalent flow $q^2_{eq}$ and has a vertical axis 36 that presents an equivalent polytropic head. On the map 32 is a surge limit line 38 that is calculated by the control system 24 wherein at points to the left of the surge limit line 38, surge within the dynamic compressor 10 typically occurs. Spaced at a predetermined distance that is considered a safety margin 40 is a surge control line 42 wherein when a control parameter reaches a point either on or to the left of the surge control line 42 the control system 24 actuates the anti-surge valve 20 to provide flow through the anti-surge valve 20. Additionally seen on the map 32 are operating control lines 44 that represent additional control lines that are used if the safety margin 40 is desired to be increased to protect against a surge within a compressor.

The compressor map 32 of the present invention is an equivalent compressor map wherein instead of attempting to measure inlet volumetric flow and apply it against polytropic head the present invention calculates a surge control parameter "R." The surge parameter R is determined by the control system 24 using the following equation:

$$R = \frac{q^2_{eq} \mid op}{q^2_{eq} \mid \text{surge}} - SM$$

where $q^2_{eq}|op$ is an operating parameter at flow conditions, $q^2_{eq}|\text{surge}$ is a surge parameter at flow conditions, and SM is a safety margin that is predetermined and entered into the control system to determine a surge control parameter or line.

The surge parameter $q^2_{eq}|\text{surge}$ is determined by first continuously calculating the compressibility of the gas or gas mixture at flow conditions. As one example, based on the gas or gas mixture type that is entered into the control system 24, and using the sensed pressure and temperature at inlet or suction, and at discharge, the control system 24 determines the gas compressibility at suction $Z_s$ and at discharge $Z_d$ from gas tables. The control system 24 then determines the gas compressibility ratio at flow conditions using the following equation:

$$Z = \frac{z_d}{z_s}$$

Next, the control system calculates a polytropic exponent "n" using the following equation:

$$n = \frac{1}{1 - \frac{\log\left[\frac{Z_d}{Z_s} \times \frac{T_d}{T_s}\right]}{\log\left[\frac{P_d}{P_s}\right]}}$$

The control system then determines the equivalent polytropic head, $h_{eq}$ using the following equation:

$$h_{eq} = c_2 \left[ \frac{\left[ R_c^{\frac{n-1}{n}} - 1 \right]}{\left[ \frac{n-1}{n} \right]} \right] * \frac{1}{n} = \frac{h_r}{n}$$

where $c_2$ is a defined scaling constant, $R_c$ is the pressure ratio across the compressor (i.e., $P_d/P_s$) and $h_r$ is the equivalent reduced head.

The control system then determines the surge parameter or surge line based upon a function of the equivalent polytropic head, $f(h_{eq})$. The function is either programmed into the control system 24 or input into the control system 24 by a user. The $f(h_{eq})$ is of many types and in one example is shown on a table where the x-axis is the calculated $h_{eq}$ and the y-axis is a calculated equivalent flow $q_{eq}^2$ at the corresponding surge point where equivalent flow is determined by known equations such as:

$$q^2_{eq} = \frac{Q^2}{V^2_c}$$

where Q is volumetric flow and $V^2_c$ is the sonic velocity of gas at flow conditions.

The control system continually calculates an operating parameter by first determining an equivalent reduced flow, $q_r^2$, using the equation:

$$q^2_r = c_1 * \frac{\Delta P_o}{P_s}$$

where $c_1$ is a constant based on a type of flow element used and piping geometry, $\Delta P_o$ is the differential pressure across flow measuring device, and $P_s$ is pressure at suction.

Next, the control system determines the operating parameter $q_r^2|op$ by dividing the equivalent reduced flow $q_r^2$ by the calculated polytropic exponent, n, or $$q^2_{eq} \mid op = \frac{q^2_r}{n}$$

In this manner, since a polytropic exponent "n" is used to model a gas compression process using Real Gas law equation, changes in gas compressibility at flow conditions are accounted for as per the embodiment of control system 24 shown in FIG. 3. In addition, based on the derived calculations shown for $h_{eq}$ and $q_{eq}^2$ there is no need to know or use the gas constant, molecular weight, or specific heat ratio in deriving a surge control parameter.

To arrive at the surge control parameter, R, the operating parameter is divided by the surge parameter and then the safety margin is subtracted so that when R≥1.0 anti-surge control valve 20 is closed and when R<1.0 the anti-surge recycle valve 20 is open.

In addition, the control system 24 determines the distance to the surge control line δ:

$$\delta = [((q_{eq}^2 | op)/f(h_{eq})) - SM] - 1 = (R-1)$$

so when δ is ≥0 the valve is closed and when δ is <0 the valve is open. Thus the surge controller acts on δ to actuate the surge valve and prevent surge.

By continuously calculating the compressibility of gas, Z, and the polytropic exponent, n, as opposed to relying on fixed gas compressibility and constants as preached in present art, a much more accurate and dynamic surge control parameter R is determined.

In operation, as the dynamic compressor 10 is operating, the control system 24 continually monitors the dynamic compressor 10. The control system 24 continually calculates an equivalent polytropic head parameter and an equivalent flow parameter in the manners discussed above. A surge limit line 38 is defined on the compressor map 32 as a function of the equivalent polytropic head parameter. The control system 24 continually calculates a distance b that a control parameter R is from the surge limit line 38 wherein the control parameter is dynamic to changes in the gas compressibility. Then, as a result of the distance the control parameter is from the surge limit line the control system 24 actuates the anti-surge valve 20 accordingly.

Thus, provided is a dynamic compressor control system that utilizes an equivalent compressor map 32 to improve upon the state of the art. The equivalent compressor map 32 bases a surge parameter on the polytropic compression process equation and modeling of the dynamic compressor 10 based on flow, pressure, speed (or inlet guide vane), compressibility and temperatures of the dynamic compressor 10. The equivalent polytropic head parameter and equivalent flow parameter are based on the dynamic similitude theory, a mach number determination using sonic velocity of gas at flowing conditions and gas compressibility.

When determining control parameter (R), the parameter is dynamic to changes in compressor load, both in the increasing and decreasing direction. Therefore, presented is a control parameter that has high dynamic sensitivity along with invariance of the surge equivalent parameter due to changes in suction pressure, temperature, gas composition, rotation speed or inlet guide vane geometry. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A method of surge protection for a dynamic compressor, comprising the steps of:
    continually calculating a surge parameter with a control system;
    continually calculating an operating parameter with the control system;
    defining with the control system a surge limit line based upon the calculated surge parameter on a compressor map;
    continually calculating a surge control parameter with the control system by dividing the calculated operating parameter by the calculated surge parameter;
    actuating a surge valve based upon a distance, continually calculated by the control system, the calculated control parameter is from the surge limit line;
    continually calculating with the control system a polytropic exponent; and
    continually calculating a compressibility of gas at flow conditions.

2. The method of claim 1 wherein the polytropic exponent is calculated by the control system using the equation:

$$n = \frac{1}{1 - \frac{\log\left[\frac{Z_d}{Z_s} \times \frac{T_d}{T_s}\right]}{\log\left[\frac{P_d}{P_s}\right]}}$$

where n is a polytropic exponent, $Z_d$ is gas compressibility at discharge, $Z_s$ is gas compressibility at suction, $T_d$ is temperature at discharge, $T_s$ is temperature at suction $P_d$ is pressure at discharge, and $P_s$ is pressure at suction.

3. The method of claim 1 further comprising the step of continually calculating an equivalent polytropic head with the control system using the equation:

$$h_{eq} = c_2 \left[ \frac{\left[ R_c^{\frac{n-1}{n}} - 1 \right]}{\left[ \frac{n-1}{n} \right]} \right] * \frac{1}{n} = \frac{h_r}{n}$$

where $h_{eq}$ is an equivalent polytropic head, $c_2$ is a scaling constant, $R_c$ is a pressure ratio across the compressor, n is a polytropic exponent, and $h_r$ is an equivalent reduced head.

4. The method of claim 1 wherein the calculated surge parameter is a function of an equivalent polytropic head.

5. The method of claim 1 wherein the calculated operating parameter is determined by the equation $$C \frac{\Delta P_o}{P_s} \times \frac{1}{n} = \frac{q_r^2}{n} = q_{eq}^2 | op$$

where c is a constant $\Delta P_o$ is a differential pressure across flow measuring device, $P_s$ is pressure at suction, n is a polytropic exponent, $q_r^2$ is an equivalent reduced flow, and $q_{eq}^2 | op$ is an equivalent flow parameter at an operating condition.

6. The method of claim 1 wherein the distance the control parameter (R) is from the surge limit line is determined based on the control parameter (R) and is a function of $[((q_{eq}^2|op)/f(h_{eq}))-1]$ where $q_{eq}^2|op$ is an equivalent flow parameter at an operating condition and $f(h_{eq})$ is a function of the equivalent polytropic head parameter.

7. The method of claim 6 wherein when the distance the control parameter (R) is from the surge limit line is greater than 0 then the compressor is operating to the right of the surge limit line and when the distance the control parameter (R) is from the surge limit line is less than or equal to 0 then the compressor is operating to the left of the surge limit line.

8. The method of claim 1, further comprising the step of continually calculating a distance the control parameter (R) is from a surge control line.

9. The method of claim 8, wherein the surge control line is determined based on the control parameter (R) and is a function of $[((q^2_{eq}|op)/f(h_{eq}))-SM]-1$ where $q^2_{eq}|op$ is the equivalent flow parameter at an operating condition, $f(h_{eq})$ is a function of the equivalent polytropic head parameter defining the surge limit line and SM is the safety margin defining the surge control line.

10. The method of claim 9 wherein when the distance a control parameter (R) is from the surge control line is equal to or greater than 0 the surge valve is closed and when the distance the control parameter (R) from the surge control line is less than 0 the surge valve is opened.

11. A method of surge protection for a dynamic compressor, comprising the steps of:
continually calculating a surge parameter with a control system;
continually calculating an operating parameter with the control system;
defining with the control system a surge limit line based upon the calculated surge parameter on a compressor map;
continually calculating a surge control parameter with the control system by dividing the calculated operating parameter by the calculated surge parameter;
actuating a surge valve based upon a distance, continually calculated by the control system, the calculated control parameter is from the surge limit line; and
continually calculating with the control system a polytropic exponent.

12. A method of surge protection for a dynamic compressor, comprising the steps of:
continually calculating a surge parameter with a control system;
continually calculating an operating parameter with the control system;
defining with the control system a surge limit line based upon the calculated surge parameter on a compressor map;
continually calculating a surge control parameter with the control system by dividing the calculated operating parameter by the calculated surge parameter;
actuating a surge valve based upon a distance, continually calculated by the control system, the calculated control parameter is from the surge limit line; and
continually calculating the compressibility of gas at flow conditions.

* * * * *